(12) United States Patent
Hoch et al.

(10) Patent No.: US 8,555,742 B2
(45) Date of Patent: Oct. 15, 2013

(54) GEARBOX FOR ADJUSTMENT DEVICES, ESPECIALLY IN MOTOR VEHICLES

(75) Inventors: Stefan Hoch, Titisee-Neustadt (DE); Stéphane Birker, Donaueschigen (DE); Michael Woehrle, Niederschach (DE)

(73) Assignee: IMS Gear GmbH, Eisenbach (DE)

( * ) Notice: Subject to any disclaimer, the term of this patent is extended or adjusted under 35 U.S.C. 154(b) by 354 days.

(21) Appl. No.: 11/514,205

(22) Filed: Sep. 1, 2006

(65) Prior Publication Data

US 2007/0068301 A1 Mar. 29, 2007
US 2008/0087122 A2 Apr. 17, 2008

(30) Foreign Application Priority Data

Sep. 16, 2005 (DE) .......................... 10 2005 044 467

(51) Int. Cl.
*F16H 1/16* (2006.01)
*F16H 1/20* (2006.01)
*F16H 55/22* (2006.01)
*F16H 55/06* (2006.01)

(52) U.S. Cl.
USPC ................................. 74/425; 74/434; 249/59

(58) Field of Classification Search
USPC .................. 74/425, 458, 438, 443, 448, 451, 74/DIG. 10, 434, 439, 424.7; 249/59; 425/444, DIG. 58
IPC ............................................. F16H 55/22,55/06
See application file for complete search history.

(56) References Cited

U.S. PATENT DOCUMENTS

| | | | |
|---|---|---|---|
| 3,106,103 A | 10/1963 | Worm | |
| 4,699,017 A | 10/1987 | Periou | |
| 5,349,878 A | 9/1994 | White | |
| 5,913,939 A * | 6/1999 | Tanaka | 74/434 |
| 6,497,041 B2 * | 12/2002 | Fujita et al. | 74/425 |
| 7,490,529 B2 * | 2/2009 | Okada et al. | 74/434 |
| 2002/0021043 A1 * | 2/2002 | Hagiwara | 301/6.5 |
| 2003/0194466 A1 * | 10/2003 | Fukuchi | 425/556 |
| 2004/0043100 A1 * | 3/2004 | Ojima | 74/DIG. 010 |
| 2004/0194566 A1 * | 10/2004 | Takayama | 74/434 |
| 2005/0082890 A1 * | 4/2005 | Taubmann et al. | 297/344.1 |

FOREIGN PATENT DOCUMENTS

| | | |
|---|---|---|
| DE | 34 34 093 A1 | 3/1986 |
| DE | 196 47 139 | 5/1997 |
| DE | 198 61 100 A1 | 2/2000 |
| DE | 102 23 676 | 12/2003 |
| EP | 0 181 240 A1 | 5/1986 |
| EP | 1 253 275 A1 | 10/2002 |
| JP | 2005 094 919 | 4/2005 |
| JP | 2005 265 169 | 9/2005 |
| WO | WO 01/40679 A2 | 6/2001 |
| WO | WO 2005/015054 A1 | 2/2005 |

* cited by examiner

*Primary Examiner* — Phillip A Johnson
*Assistant Examiner* — Daniel Yabut
(74) *Attorney, Agent, or Firm* — Nath, Goldberg & Meyer; Jerald L. Meyer

(57) ABSTRACT

The invention involves a gearbox, especially for adjustment devices in motor vehicles, with a plastic worm drive. The invention provides that the worm drive has an encircling, circular flat contact surface perpendicular to the worm axle and a number of removal pockets in the form of recesses that are interposed axially between contact surface and the worm axle and at the same time arranged in a level recessed to the level of contact surface, whereby an encircling bevel is formed in the transition area from level of removal pockets to the level of the circular contact surface.

14 Claims, 3 Drawing Sheets

GEARBOX FOR ADJUSTMENT DEVICES, ESPECIALLY IN MOTOR VEHICLES

RELATED APPLICATIONS

This application claims priority to German Application No. 10 2005 044 467.9 filed on Sept. 16, 2005, the contents of which are incorporated herein by reference.

BACKGROUND

This invention concerns a gearbox, especially for adjustment devices in motor vehicles.

SUMMARY

A worm drive for adjustment devices in motor vehicles is known from DE 198 61 100. This type of adjustment device consists of a gear motor, which first drives a worm drive, preferably by means of a flexible spindle, that in turn drives a spindle nut arranged on a torque-proof threaded spindle. At the same time, the parts linked directly or indirectly with the worm drive or spindle nut are moved along the spindle relative to the rest of the vehicle. Such adjustment devices are particularly suitable as seat-adjustment devices for motor vehicles, as window lifts or as adjustment devices for retractable roofs.

Worm drives and spindle nuts are typically arranged in a gearbox whose exterior contour is then held by a holding device. The holding device serves for example to connect the part of the motor vehicle to be adjusted to the adjustment device's gearbox.

State-of-the-art gearboxes for adjustment devices in motor vehicles typically are equipped with gearbox elements made out of metal. For example, worm drives are laboriously milled out of wear-resistant metal from a metal piece, which places high demands on the processing machine. This leads to correspondingly high unit costs. Another disadvantage of using such metal gearbox elements is the tendency of the metal to become noisy. Although these noises can be prevented by appropriate lubrication, such gearboxes for adjustment devices in motor vehicles are not easily accessible after installation, so that as the effect of lubrication decreases undesired noises can develop:

Another disadvantage of metal worm drives is produced by the fact that when the drive uses a flexible spindle, play develops between the square socket, which contains the flexible spindle, and the flexible spindle, which impairs the rotation of the flexible spindle. This also reduces optimal functioning of the adjustment device.

Attempts to offset the disadvantages of metal worm drives by using plastic worm drives have been partially successful. For example, in the past the applicant of this invention used worm drives made from high-performance plastics; this reduces the development of noise. Another advantage of these plastic worm drives compared to metal worms is lower manufacturing costs.

High-performance plastics such as polyetheretherketone (PEEK), polyamide (PA), polyphenylene sulfide (PPS) or polyoxymethylene (POM) have proved to be suitable plastics for the manufacture of such worm drives. Because of its high strength, high rigidity, good chemical resistance, its favorable slip and abrasion resistance, as well as its other thermal and chemical properties, polyetheretherketone can be used especially advantageously as an excellent material for functional parts in motor-vehicle manufacture.

PEEK is used at a mold temperature (temperature of the injection mold) of approximately 185° C. The injection temperature of the material comes to approximately 380° C. One disadvantage of use under such conditions is the high level of adhesion of the material to the mold. For example, in the manufacture of plastic worms, pins are used after molding to help unscrew the part from the tool in order to facilitate rapid removal of the worm drive from the still-warm mold. At the same time, these pins are interposed in so-called "removal pockets" that are arranged in the form of cavities in the part. Cycle times for larger PEEK plastic worms can also be reduced enough to enable the manufacture of plastic worms to become cost-effective. However, this method's disadvantage is the high elasticity of the material until its final plastification. For example, interposing the auxiliary pins in the removal pockets and then unscrewing them from the mold can lead to deformation of the part. Especially critical for such deformations is the contact surface on the front of the worm drive. Deformations on the contact surface of the worm drive lead to vibrations during operation of the gearbox, resulting in unsatisfactory functioning of the adjustment device.

The task of the invention is thus to provide a gearbox that does not have the state of the art's disadvantages as described above.

This task is solved by a gearbox with the characteristics of the exemplary embodiments below.

The subject matter of the sub-claims is advantageous embodiments and further developments.

The basic goal of the invention is to avoid the disadvantages of the state of the art by using a gearbox with a plastic worm drive in which the worm drive fulfills certain geometric requirements.

According to the invention, the worm drive has a revolving, circular and flat contact surface that is perpendicular to the worm drive, which facilitates vibration-free operation of the gearbox. An absolutely flat contact surface is obtained when the part is allowed to cool in the injection mold long enough before it is taken out. However, because not only is the technical functioning of the worm drive crucial but manufacturing costs also play a large role, sufficiently rapid removal of the worm drive from the injection mold (of the tool) must be ensured. This is achieved with help from a number of removal pockets that are interposed axially in the worm drive in the form of cavities and at the same time are distributed across the extent of the removal pockets (preferably symmetrically), whereby the number of removal pockets is advantageously between 3 and 15, and especially advantageously between 6 and 10. When the worm drive is unscrewed from the mold, the auxiliary pins are interposed in the removal pockets. The removal pockets are advantageously arranged between the contact surface and the worm axis at a level deeper than the level of the contact surface. Deepening the level of the removal pockets is a first step toward avoiding deformations in the area of the contact surface, because in this way force is not transferred directly onto the contact surface.

However, especially in the case of large plastic worms, this step by itself is not sufficient to reliably avoid deformation of the contact surface when the thermoelastic part is unscrewed from the tool mold. This leads to deformations on the contact surface, namely by a disadvantageous transfer of force, primarily where the bars that separate the individual removal pockets from one another meet on the area of the contact surface.

According to the invention, such deformations of the contact surface can be reliably avoided by forming a bevel in the transition area from the level of the circular contact surface to the level of the removal pockets. With the help of this encircling bevel, the force that occurs when the worm drive is unscrewed from the tool is no longer transferred to the contact surface but rather any deformations now occur within the bevel, where they cannot cause any trouble.

The angle between the encircling bevel and the circular contact surface is between 20.degree. and 60.degree. In an especially advantageous embodiment, the angle is between roughly 30.degree. and roughly 45.degree.

To ensure that the contact surface is sufficiently protected, the recess between the level of the removal pockets and the level of the circular contact surface, which is bridged by the encircling bevel, is between 0.1 and 2 mm. At the same time, it has been shown to be especially advantageous if the distance between the two levels is roughly 0.5 mm.

In the axial direction of the worm drive of the present invention there is a square socket to incorporate a flexible spindle. At the same time, in one advantageous embodiment the surfaces of the square socket have axial slots that can be used in addition to the removal pockets as attachment options for a corresponding counter-piece in order to eject the part better. In one especially advantageous design, at least one of the slots is tapered so that no vacuum is formed when the worm is ejected.

Special advantages are also achieved when a total of eight slots are arranged asymmetrically on the inner surface of the square and at the same time, preferably each inner surface has two parallel centered slots. In this way a "squeeze" rib can be designed on each of the four inner surfaces of the square socket at an appropriate distance from the parallel slots. This rib makes it possible to attach the flexible driveshaft free of play.

When the gearbox of the present invention is used for an adjustment device in vehicles, a spindle nut arranged on a spindle drives a worm drive, which is driven by a flexible spindle, by a drive motor. Depending on whether the spindle rotates or is torque-free, the parts connected directly or indirectly with the gearbox are moved along the spindle or, in the case of a rotating spindle, the parts arranged on the spindle move in relation to the vehicle. A gearbox of the type described above is especially suitable for a seat-adjustment device, as shown in the exemplary drawings included herein.

DETAILED DESCRIPTIONS

FIGS. 1 through 5a explain the invention in detail using as an example a section of an adjustment device for seats in motor vehicles.

Figure 1:
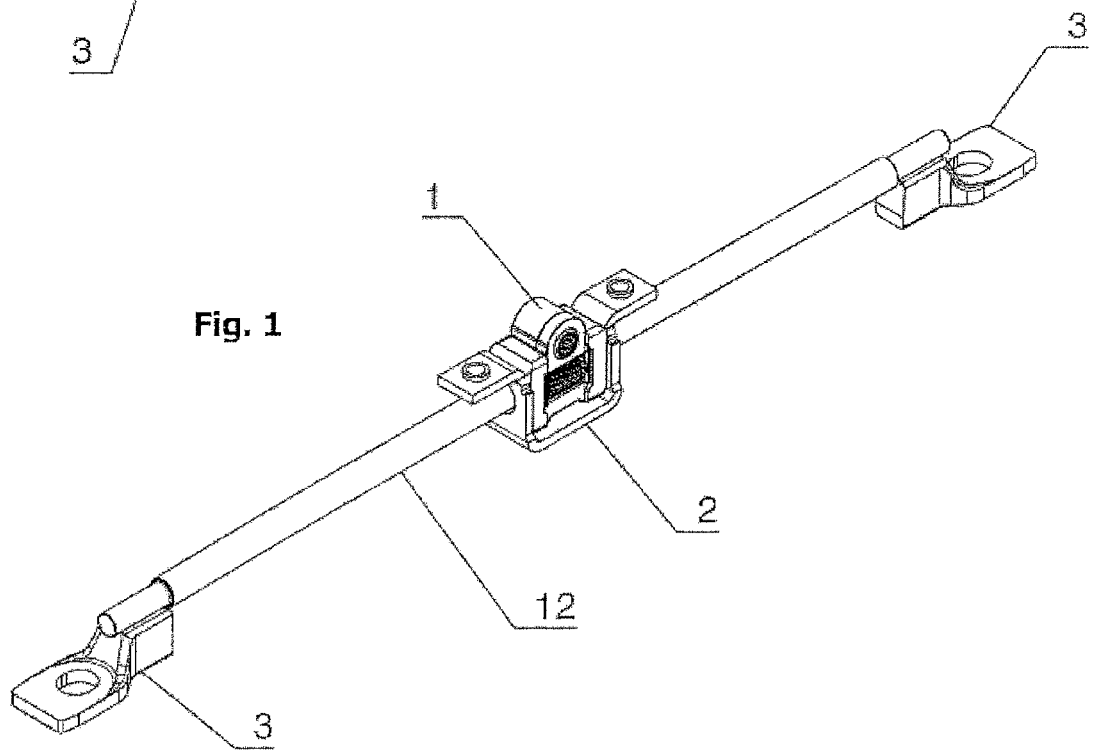
FIG. 1 a perspective drawing of a gearbox with spindle drive, including holder.

FIG. 1 uses perspective to show gearbox 1 together with spindle drive 12 and holder 2 for gearbox 1, as well as holders 3 for spindle drive 12. Spindle drive 12 is attached so as not to turn to holders 3. Gearbox 1, along with holder 2, can be moved along spindle 12, driven by a flexible spindle (not shown in the figure). Spindle 12 itself is connected in a fixed manner to the body of the vehicle or to other parts of the vehicle by means of holders 3 so that the parts connected to gearbox 1 by means of holder 2 move along the spindle together with gearbox 1 in relation to the rest of the vehicle.

Figure 2:
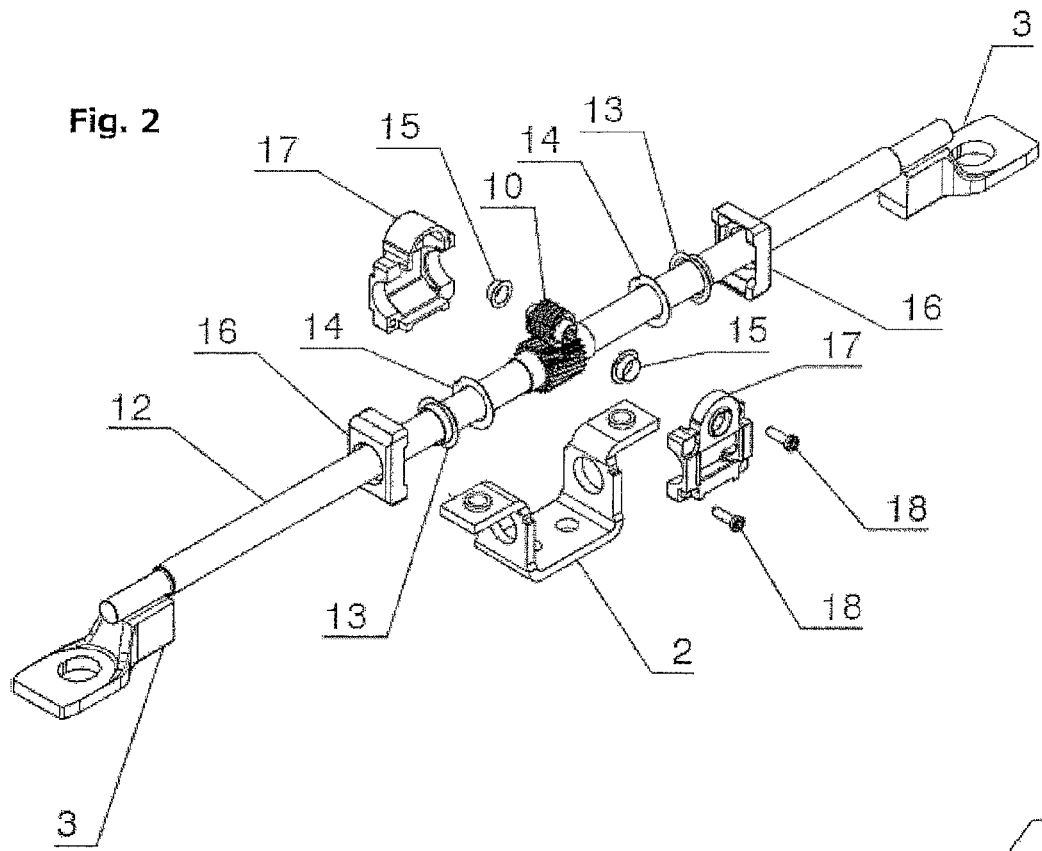
FIG. 2 a breakdown drawing of the gearbox with spindle drive and holders.

FIG. 2 shows a breakdown drawing of the gearbox 1 shown in FIG. 1 together with spindle drive 12 and holders 2, 3. Visible at the same time as functional elements of gearbox 1 are worm drive 10, spindle nut 11, bearing bushes 13, 15, washer disk 14, spindle housing 17 together with attachment bolts 18, and decoupling elements 16. Spindle nut 11, located on spindle drive 12, is driven by worm drive 10 and moves along spindle 12. To ensure synchronization of gearbox 1, in each instance bearing bushes 13, and washer disks 14 are arranged between the functional elements of gearbox 1 and housing parts 17 and/or decoupling elements 16. At the same time, bearing bushes 15 sit directly on the contact surface 27 of worm drive 10. The gearbox is held together by attachment bolts 18, which connect the two housing parts 17 to each other. Gearbox 1 is attached to the spindle with the help of holder 2.

Figure 3:
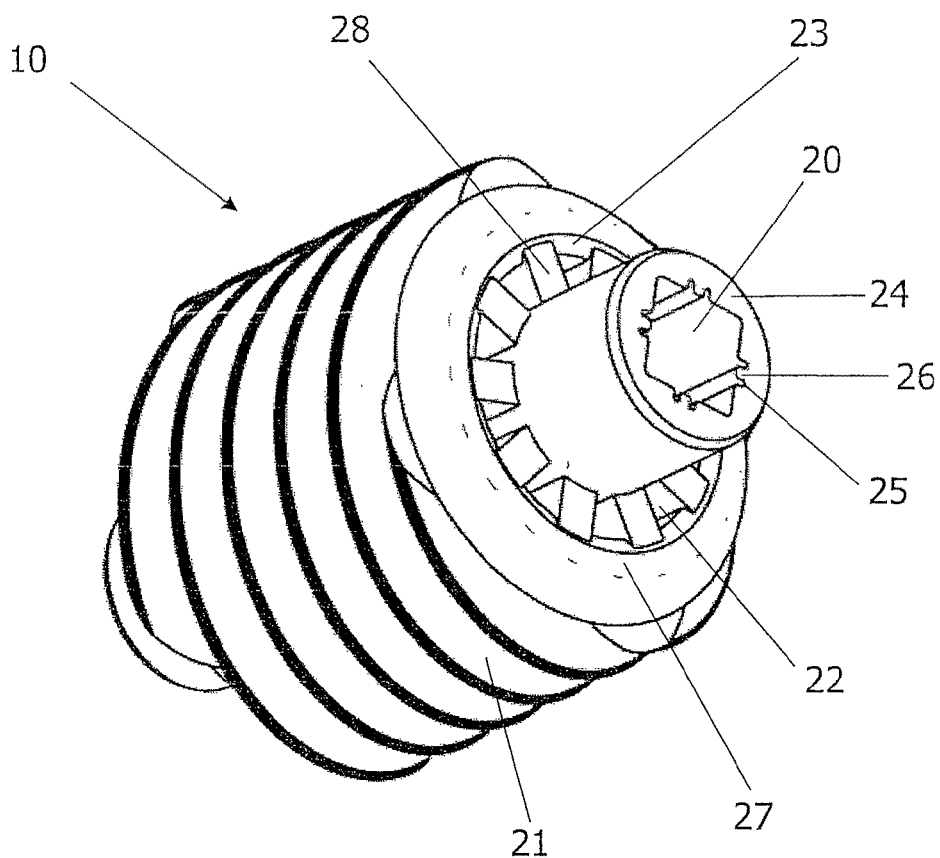
FIG. 3 a perspective drawing of the worm drive.

FIG. 3 shows a perspective drawing of worm drive 10. The circular flat surface 27 circling perpendicular to the worm axle is identified by dashes. Removal pockets 22 are arranged between contact surface 27 and the worm axle; these pockets are attached axially to the worm drive. At the same time, the removal pockets 22 are arranged in level 29, which is lower than the level of contact surface 27, and separated from one another by bar 28. The transition area from the level of contact surface 27 to level 29 of removal pockets 22 and bars 28 is formed by a encircling bevel 23 that at the same time forms an angle to contact surface 27 between 20.degree. and 60.degree. The recess from the level of contact surface 27 to level 29 of removal pockets 22 is between 0.1 and 2 mm.

Worm drive 10 has in the axial direction a square socket 24 that protrudes axially from worm drive 10 and which is able to accept, for example, a flexible driveshaft. Each inner surface 20 of square socket 24 has in this instance two parallel, axially running slots 25 that are arranged so that in each instance they simultaneously form a squeeze rib 26 in the center of an inner surface 20, which enables, for example, a flexible spindle to be attached without play. In addition, the slots 25 running axially can themselves be used at the removal pockets 22 as attachment options for correspondingly formed counterparts when unscrewing worm drive 10 from the mold. In one especially preferred embodiment, slots 25 are tapered, which can prevent the formation of a vacuum when unscrewing the part from the mold.

Figure 4:
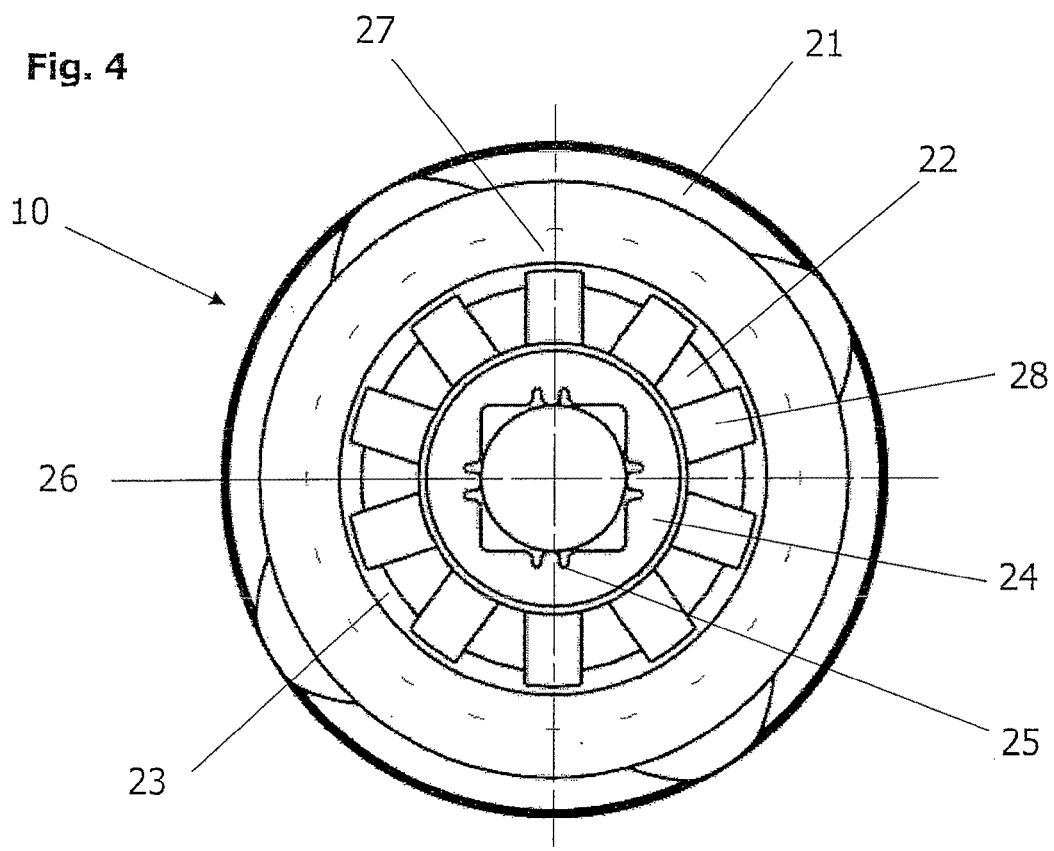
FIG. 4 a top view of the worm drive.

Clearly visible in the top view in the axial direction to the worm drive in FIG. 4 is the bevel 23 formed between level 29 of removal pockets 22 and the level of contact surface 27.

Figure 5:
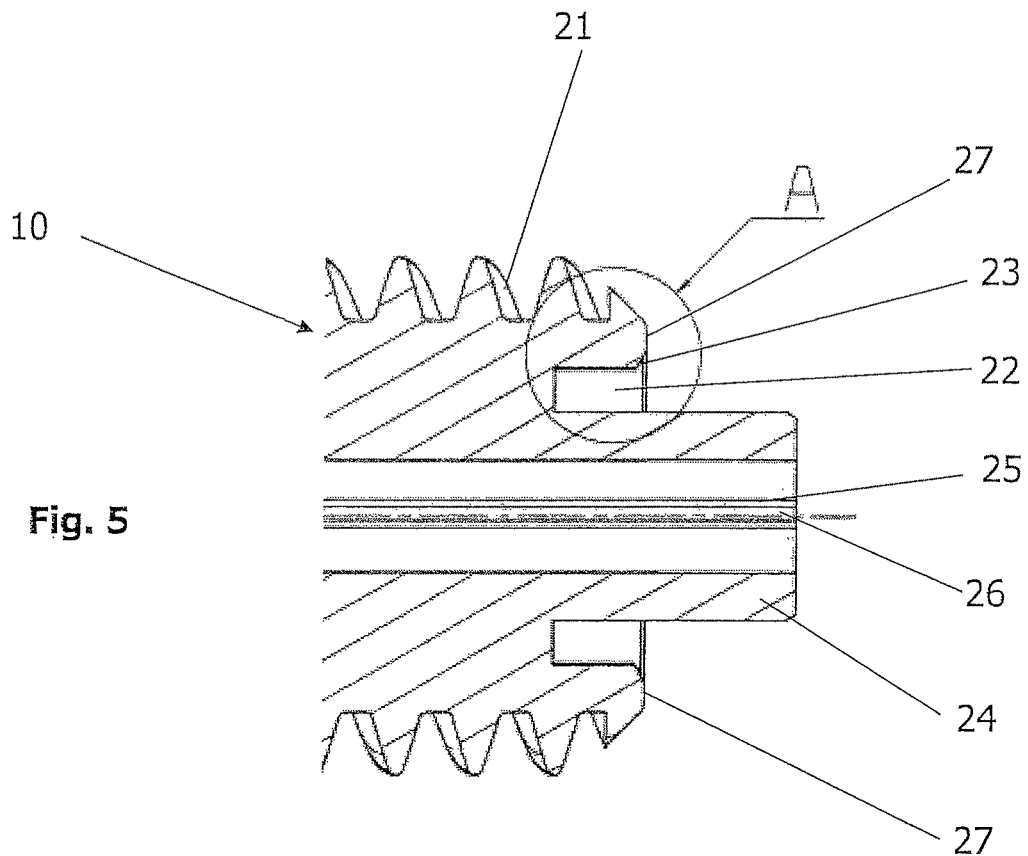
FIG. 5 a longitudinal section of the worm drive.
Figure 5A:
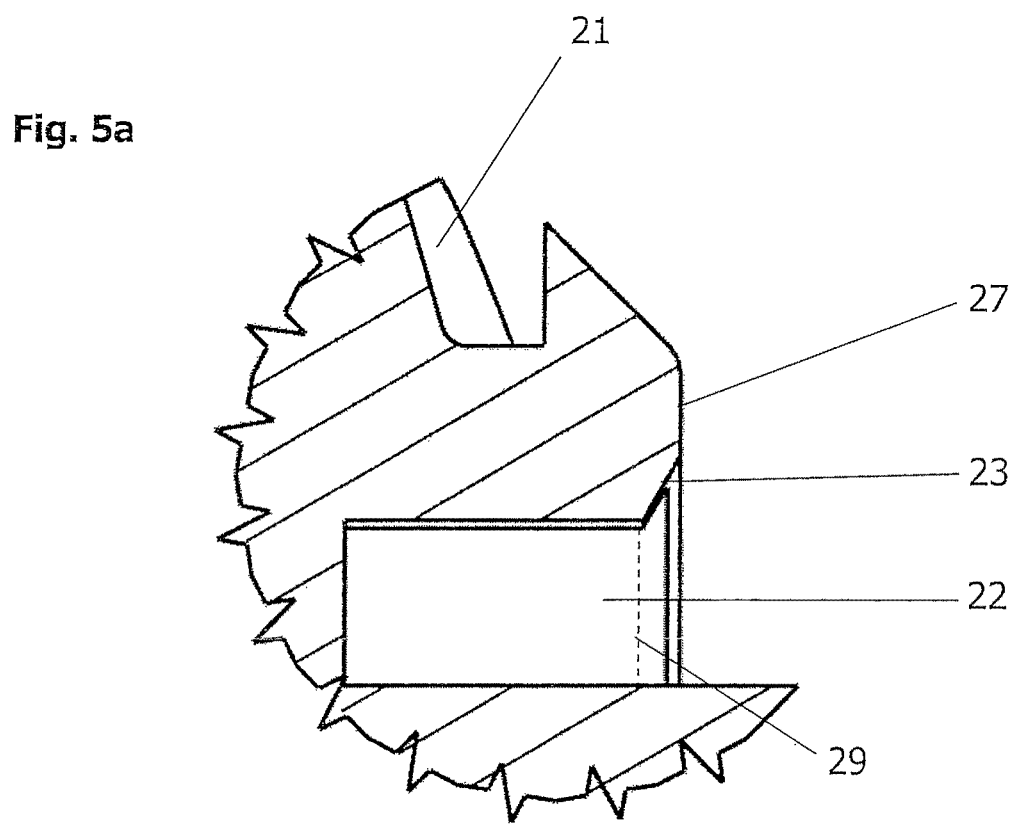
FIG. 5a a cut-out from the longitudinal section (FIG. 5) of the worm drive.

FIG. 5a, which forms one section from the longitudinal section of the worm drive (FIG. 5), clearly shows the recess of level 29 of removal pockets 22 vis-a-vis the level of contact surface 27. The formation of bevel 23 between the two levels can also be seen.

FIGS. 1 through 5a solely help to explain the invention as an example for an adjustment device for seats in motor vehicles. However, this does not limit the range of the invention, which is solely defined by the claims formulated below.

TERMINOLOGY

1 Gearbox
2 Holder
3 Holder
10 Worm drive
11 Spindle nut
12 Spindle
13 Bearing bush 14 Washer disk
15 Bearing bush
16 Decoupling element
17 Housing
18 Attachment bolt
20 Square inner surface
21 Worm toothing
22 Removal pocket
23 Bevel
24 Square socket
25 Slot
26 Squeeze rib
27 Contact surface
28 Bar
29 Level of the removal pockets

The invention claimed is:

1. A gearbox, comprising:
a one-part worm drive made entirely from plastic;
a circular, flat contact surface circling perpendicular to a worm axle and at least seven removal pockets attached axially to the worm drive between the contact surface and the worm axle and extending into a level in an interior of the worm drive below a level of the contact surface; and
an encircling bevel capping a transition area from the level of the interior of the worm drive to the level of the contact surface, the removal pockets define a plurality of bars each including axial top surfaces, wherein the transition area axially overlaps the axial top surfaces.

2. The gearbox according to claim 1, characterized in that the worm drive is made from a thermostable high-performance plastic selected from the group consisting of polyetheretherketone (PEEK), polyamide (PA), polyphenylene sulfide (PPS) and polyoxymethylene (POM).

3. The gearbox according to claim 2, characterized in that the worm drive is made from PEEK.

4. The gearbox according to claim 1, characterized in that the number of removal pockets is seven to fifteen.

5. The gearbox according to one of claims 1 through 4, characterized in that the angle of the encircling bevel to the contact surface is between 20° and 60°.

6. The gearbox according to claim 1, characterized in that a recess between the level of the interior of the worm drive and the level of the contact surface is 0.1 to 2 mm.

7. The gearbox according to claim 1, characterized in that the, worm drive has a square socket in the axial direction to accept a flexible spindle.

8. The gearbox according to claim 7, characterized in that the surfaces of the square socket have axial slots.

9. The gearbox according to claim 8, characterized in that at least one of the slots is tapered.

10. The gearbox according to claim 7, characterized in that a total of eight slots (25) are arranged asymmetrically on an inner surface (20) of the square (24), whereby each side of the inner surface (20) has two parallel, centered slots.

11. The gearbox according to claim 10, characterized in that between each of the two parallel slots on the surface (20) of the square socket (24) a squeeze rib (26) is formed for the attachment without play of a flexible spindle.

12. The gearbox (1) according to claim 1, for an adjustment device in motor vehicles, characterized in that a spindle nut (11) that is arranged on a torque-proof spindle (12) drives a worm drive (10), whereby vehicle parts connected to the gearbox (1), consisting of the worm drive (10) and spindle nut (11), move in relation to the rest of the vehicle.

13. The gearbox (1) according to claim 1, for an adjustment device in motor vehicles, characterized in that a spindle nut (11) that is arranged on a rotating spindle (12) drives a worm drive (10), whereby vehicle parts connected to the spindle (12) move in relation to the rest of the vehicle.

14. The gearbox according to claim 1 for use in a seat-adjustment device for motor vehicles.

\* \* \* \* \*

UNITED STATES PATENT AND TRADEMARK OFFICE
CERTIFICATE OF CORRECTION

| | | |
|---|---|---|
| PATENT NO. | : 8,555,742 B2 | Page 1 of 1 |
| APPLICATION NO. | : 11/514205 | |
| DATED | : October 15, 2013 | |
| INVENTOR(S) | : Hoch et al. | |

It is certified that error appears in the above-identified patent and that said Letters Patent is hereby corrected as shown below:

On the title page item (75), lines 1 and 2, in the address of the Inventors:

After "Stéphane Birker" and before "(DE)",
  please delete "Donaueschigen" and replace with --Donaueschingen--

After "Michael Woehrle" and before "(DE)"
  please delete "Niederschach" and replace with --Niedereschach--

Signed and Sealed this
Twenty-eighth Day of January, 2014

Michelle K. Lee
*Deputy Director of the United States Patent and Trademark Office*